US010401487B2

(12) United States Patent
Lim et al.

(10) Patent No.: US 10,401,487 B2
(45) Date of Patent: Sep. 3, 2019

(54) RADAR DEVICE FOR VEHICLE AND TARGET MEASUREMENT METHOD THEREFOR

(71) Applicant: MANDO CORPORATION, Pyeongtaek-si, Gyeonggi-do (KR)

(72) Inventors: HaeSueng Lim, Yongin-si (KR); JaeEun Lee, Seoul (KR); Seong Hee Jeong, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 354 days.

(21) Appl. No.: 15/355,056

(22) Filed: Nov. 18, 2016

(65) Prior Publication Data

US 2017/0146647 A1 May 25, 2017

(30) Foreign Application Priority Data

Nov. 20, 2015 (KR) .................. 10-2015-0163076

(51) Int. Cl.
*G01S 13/58* (2006.01)
*G01S 7/35* (2006.01)
(Continued)

(52) U.S. Cl.
CPC ............ *G01S 13/584* (2013.01); *G01S 7/352* (2013.01); *G01S 13/345* (2013.01);
(Continued)

(58) Field of Classification Search
CPC ........ G01S 13/931; G01S 13/34; G01S 7/352; G01S 13/345; G01S 13/584; G01S 7/35;
(Continued)

(56) References Cited

U.S. PATENT DOCUMENTS 5,920,280 A * 7/1999 Okada .................. G01S 13/345
342/109
6,606,052 B1 * 8/2003 Miyahara .............. G01S 13/343
342/107

(Continued)

FOREIGN PATENT DOCUMENTS

CN 1252491 C 4/2006
CN 101573633 A 11/2009
(Continued)

OTHER PUBLICATIONS

The Chinese Office Action dated Mar. 18, 2019 in connection with the counterpart Chinese Patent Application No. 201611023600.5, citing the above reference(s).

*Primary Examiner* — Olumide Ajibade Akonai
(74) *Attorney, Agent, or Firm* — Hauptman Ham, LLP

(57) ABSTRACT

The disclosure relates to a radar device for a vehicle, enabling distance and velocity of a target approaching at a high speed in a short distance to be measured while securing a detection performance of the target. The radar device includes at least: a transmission unit configured to transmit, as a transmission signal, a multi-chirp signal having different slopes through the transmission antenna; a reception unit configured to receive, through the reception antenna, a reception signal that is the transmission signal reflected on the target located before the vehicle, in which the transmission signal is transmitted by the transmission unit; and a signal processing unit configured to calculate a frequency difference between the transmission signal and the reception signal, frequency variation according to a distance of the target, and frequency variation according to the velocity of the target to measure the distance and velocity of the corresponding target.

8 Claims, 9 Drawing Sheets

(51) Int. Cl.
 *G01S 13/93* (2006.01)
 *G01S 13/34* (2006.01)
 *G01S 7/40* (2006.01)

(52) U.S. Cl.
 CPC ........... *G01S 13/931* (2013.01); *G01S 7/4021* (2013.01); *G01S 2013/9375* (2013.01)

(58) Field of Classification Search
 CPC ........... G01S 2013/9375; G01S 17/325; G01S 7/4021
 See application file for complete search history.

(56) References Cited

U.S. PATENT DOCUMENTS

| | | | |
|---|---|---|---|
| 8,169,312 B2* | 5/2012 | Frederick | G01S 13/58 340/10.1 |
| 2003/0016163 A1* | 1/2003 | Isaji | G01S 7/35 342/70 |
| 2012/0235857 A1* | 9/2012 | Kim | G01S 13/345 342/134 |
| 2014/0184437 A1* | 7/2014 | Takabayashi | G01S 13/66 342/107 |
| 2014/0247181 A1* | 9/2014 | Nogueira-Nine | G01S 13/26 342/128 |
| 2016/0131741 A1* | 5/2016 | Park | G01S 13/42 342/194 |
| 2017/0115386 A1* | 4/2017 | Morinaga | G01S 13/34 |

FOREIGN PATENT DOCUMENTS

| | | |
|---|---|---|
| CN | 102680963 A | 9/2012 |
| KR | 10-2014-0083709 A | 7/2014 |

\* cited by examiner

RADAR DEVICE FOR VEHICLE AND TARGET MEASUREMENT METHOD THEREFOR

CROSS REFERENCE TO RELATED APPLICATION

This application claims priority from Korean Patent Application No. 10-2015-0163076, filed on Nov. 20, 2015, which is hereby incorporated by reference for all purposes as if fully set forth herein.

BACKGROUND OF THE INVENTION

1. Field of the Invention

The present embodiments relate to a radar device for a vehicle and a target measurement method therefor and, more particularly, to a radar device for a vehicle, enabling a distance and a velocity of a target approaching at a high speed in a short distance to be measured while securing a detection performance of the target, using a multi-chirp signal having different slopes, and a target measurement method therefor.

2. Description of the Prior Art

A general FMCW-type radar device for a vehicle acquires distance and velocity information using a frequency difference between a transmission signal which gradually changes over time and a reception signal which changes by a target. Here, since a demodulated signal has frequency variations generated by a distance and a velocity of the target mixed therein, a combination of an up-chirp in which frequency gradually increases over time and a down-chirp in which frequency gradually decreases over time is used in order to divide the mixed frequency variations so as to calculate the accurate distance and velocity of the target.

FIG. 1A is a diagram illustrating a transmission signal that is transmitted through a transmission antenna, and a reception signal that is the transmission signal reflected on a target and returns. FIG. 1B is a diagram illustrating a frequency difference between the transmission signal and the reception signal which are illustrated in FIG. 1A. The distance and velocity of the target are mathematically calculated based on the frequency difference between the transmission signal and the reception signal illustrated in FIG. 1B.

However, signal variation by the distance of the target is determined to be in a specific direction and frequency variation by velocity of the target changes in two directions according to the positive (+) or negative (−) velocity. Therefore, when a target that is in a close distance from a radar device and has a large velocity element is present, that is, when an object approaching at a high speed in a short distance is present, a sum of the signal velocity according to the distance and the signal velocity according to the velocity has a negative value (−), as illustrated in FIG. 2. Accordingly, there may occur a problem of an undetected or mistakenly detected target approaching at a high speed in a short distance.

There are two methods for acquiring correct target information, that is, solving a problem of an undetected or mistakenly detected target approaching at a high speed in a short distance, the methods for enabling to distinguish a negative (−) frequency value through I/Q scheme-hardware, and making the slope of a chirp signal steep so that the occurrence of such a frequency inversion phenomenon is minimized.

However, implementation of an I/Q scheme has a disadvantage of requiring additional hardware resources and calculation processing procedures, and a scheme for making the slope of a chirp signal steep has a disadvantage of deteriorating the accuracy of velocity of a high-performance ADC or a target.

CITATION LIST

Patent Document

Republic of Korea Patent Application Publication No. 2014-0083709 (2014.07.04) entitled "Radar device and signal processing method applied thereto"

SUMMARY OF THE INVENTION

The purpose of the present disclosure is to provide a radar device for a vehicle enabling a distance and a velocity of a target approaching at a high speed in a short distance to be measured while a detection performance of the target is being secured, using a multi-chirp signal having different slopes, and a target measurement method therefor.

An embodiment for achieving the purpose provides an FMCW-type radar device for a vehicle, including a transmission antenna and a reception antenna that are installed in a vehicle to detect a target located before the vehicle, the radar device for a vehicle, including: a transmission unit configured to transmit, as a transmission signal, a multi-chirp signal having different slopes through the transmission antenna; a reception unit configured to receive, through the reception antenna, a reception signal that is the transmission signal reflected on the target located before the vehicle, in which the transmission signal is transmitted by the transmission unit; and a signal processing unit configured to process the transmission signal and the reception signal so as to calculate distance and velocity information of the target, wherein the signal processing unit is configured to calculate, using frequency information of the transmission signal and frequency information of the reception signal, each of i) a frequency difference between the transmission signal and the reception signal, ii) frequency variation according to a distance of the target, and iii) frequency variation according to a velocity of the target.

The multi-chirp signal may include a first chirp signal having a predetermined first slope and a second chirp signal having a predetermined second signal, in which the first slope and the second slope may be different.

The signal processing unit may include: a calculation unit configured to calculate a frequency difference between a transmission signal with respect to the first chirp signal in the transmission signal and a reception signal, frequency variation according to the distance of the target, and frequency variation according to the velocity of the target; a determination unit configured to determine whether a sum of the calculated frequency variation according to the distance of the target and the calculated frequency variation according to the velocity of the target is less than zero; and a target measurement unit configured to measure the distance and velocity of the target by using a sum of frequency variation according to the distance of the target and frequency variation according to the velocity of the target, the frequency variations calculated through the second chirp signal in the transmission signal, when the sum is less than zero, and measure the distance and velocity of the target by using a sum of frequency variation according to the distance of the target and frequency variation according to the velocity of the target, the frequency variations calculated through the first chirp signal in the transmission signal, when the sum is equal to or greater than zero, based on the result of the determination by the determination unit.

The slope of the second chirp signal may be configured to be steeper than the slope of the first chirp signal.

In addition, another embodiment provides a target measurement method for an FMCW-type radar device for a vehicle, including a transmission antenna and a reception antenna that are installed in a vehicle to detect a target located before the vehicle, the target measurement method for a radar device for a vehicle, including: transmitting, as a transmission signal, a multi-chirp signal having different slopes through the transmission antenna; receiving, through the reception antenna, a reception signal that is the transmission signal reflected on the target located before the vehicle, in which the transmission signal is transmitted through the transmission unit; and processing the transmission signal and the reception signal so as to calculate distance and velocity information of the target, wherein measuring a distance and a velocity of the target includes calculating, using frequency information according to time of the transmission signal and frequency information according to time of the reception signal, each of i) a frequency difference between the transmission signal and the reception signal, ii) frequency variation according to a distance of the target, and iii) frequency variation according to a velocity of the target.

The multi-chirp signal may include a first chirp signal having a predetermined first slope and a second chirp signal having a predetermined second slope, in which the first slope and the second slope may be different.

Measuring the distance and velocity of the target may comprise: calculating a frequency difference between a transmission signal through the first chirp signal in the transmission signal and a reception signal, frequency variation according to the distance of the target, and frequency variation according to the velocity of the target; determining whether a sum of the calculated frequency variation according to the distance of the target and the calculated frequency variation according to the velocity of the target is less than zero; and, based on the result of the determination, measuring the distance and velocity of the target by using a sum of frequency variation according to the distance of the target and frequency variation according to the velocity of the target when the sum is less than zero, the frequency variations calculated through the second chirp signal in the transmission signal, and measuring the distance and velocity of the target by using a sum of frequency variation according to the distance of the target and frequency variation according to the velocity of the target when the sum is equal to or greater than zero, the frequency variations calculated through the first chirp signal in the transmission signal.

According to an embodiment, the present disclosure can measure a distance and a velocity of a target approaching at a high speed in a short distance while securing a detection performance of the target, using a multi-chirp signal having different slopes.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, a preferable embodiment of the present disclosure is described in detail with reference to accompanying drawings.

Figure 1A:
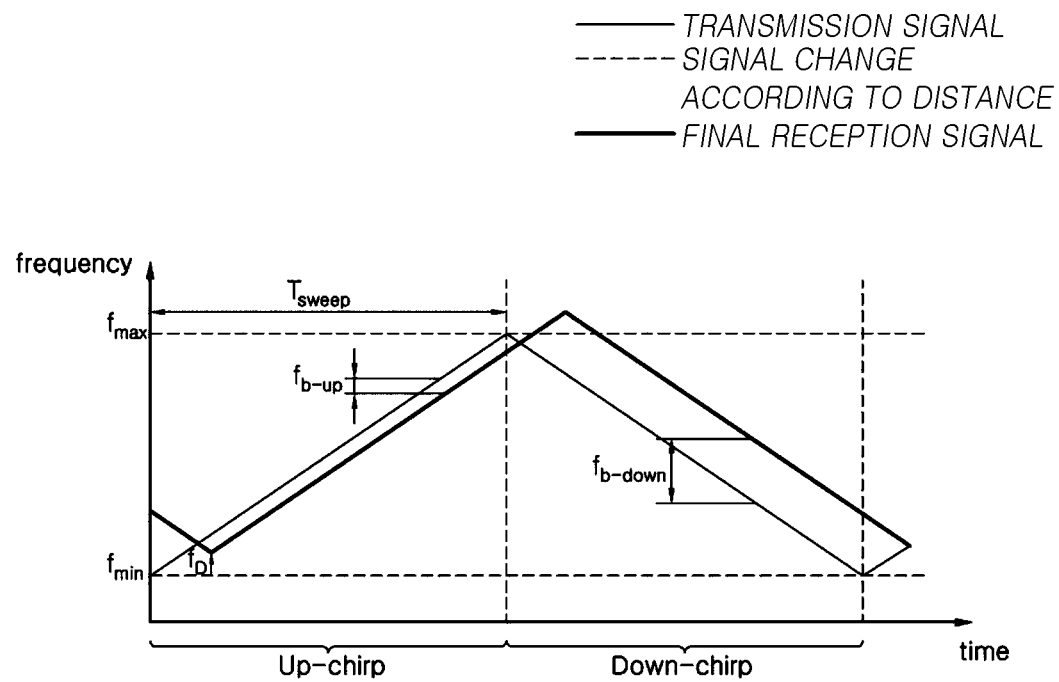
FIG. 1A and FIG. 1B is a diagram displaying a transmission signal and a reception signal that use a conventional chirp signal, and a frequency difference between the transmission signal and the reception signal.
Figure 1B:
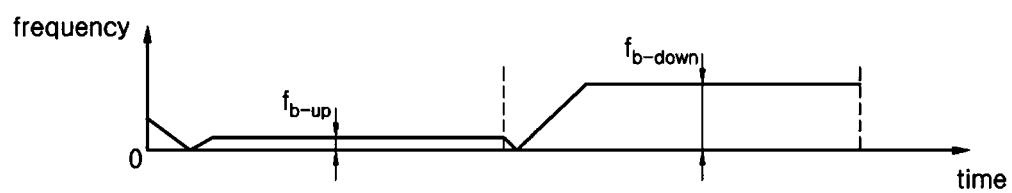
Figure 2:
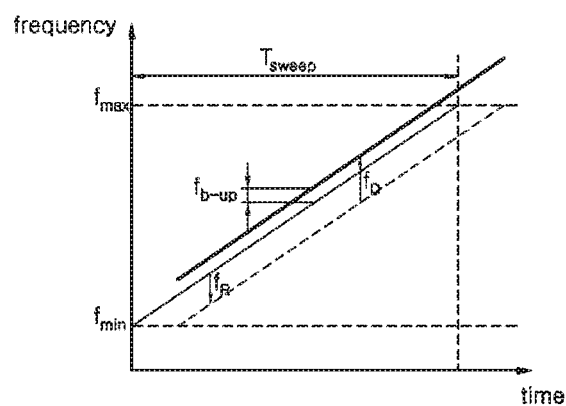
FIG. 2 is a diagram displaying an environment in which a sum of frequency variation according to distance and frequency variation according to velocity has a negative (−) value.
Figure 3:
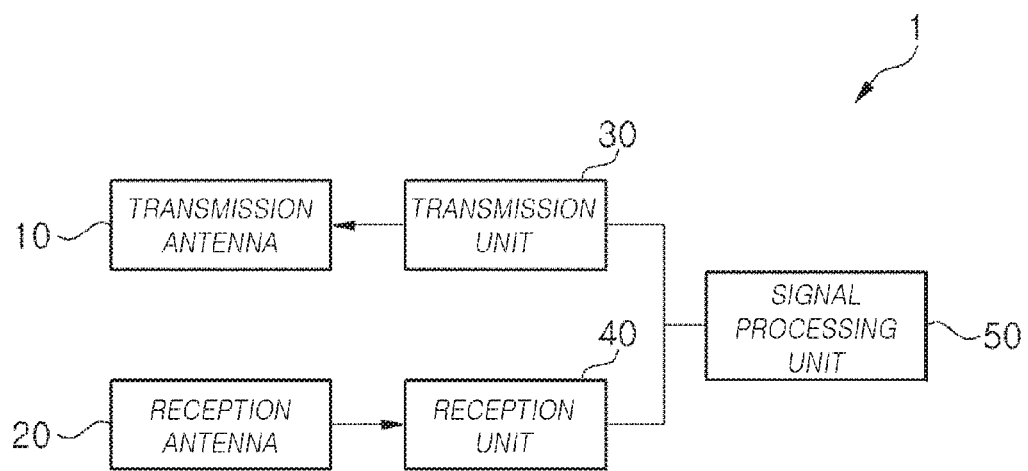
FIG. 3 is a diagram for describing a radar device for a vehicle according to an embodiment.
Figure 4:
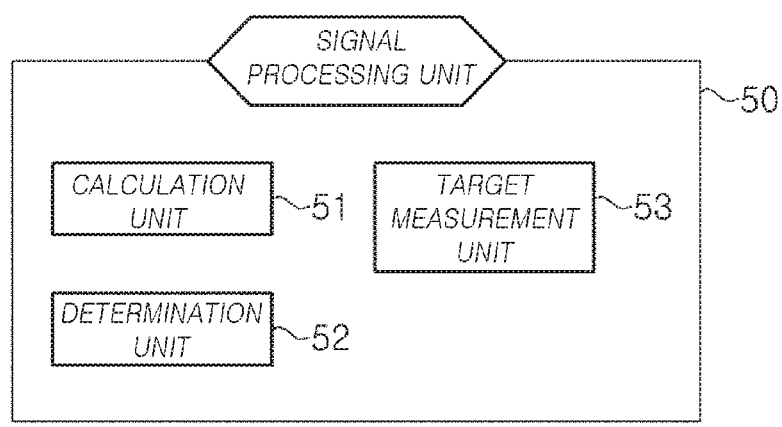
FIG. 4 is a diagram for describing the signal processing unit illustrated in FIG. 3.

FIG. 3 illustrates a diagram for describing a radar device for a vehicle according to an embodiment, and FIG. 4 illustrates a diagram for describing the signal processing unit illustrated in FIG. 3.

Referring to FIG. 3, a radar device 1 for a vehicle according to an embodiment may be installed in a vehicle and detect a target locating before the vehicle.

Such a radar device 1 for a vehicle is a Frequency Modulation Continuous Wave (FMCW)-type radar device for a vehicle, and includes a transmission antenna 10, a reception antenna 20, a transmission unit 30, a reception unit 40, and a signal processing unit 50.

The transmission unit 30 transmits a multi-chirp signal having different slopes through the transmission antenna 10.

The above described transmission unit 30 transmits a first chirp signal and a second chirp signal, to which a sweep time is configured in order to improve accuracy of the velocity of the target, through the transmission antenna 10.

Here, the first chirp signal and the second chirp signal have different slopes. For example, the first chirp signal may have a gentle slope and the second slope may have a steep slope.

The first and second chirp signals are a pair of FMCW waveforms including an up-chirp that is a waveform in which frequency linearly increases as time increases and a down-chirp that is a waveform in which frequency linearly decreases as time increases, respectively. Therefore, in the present specification, each of the first chirp signal and the second chirp signal is described to include both up-chirp and down-chirp signals, and one chirp signal is used to describe one up-chirp signal and one down-chirp signal as necessary.

The reception unit 40 receives, through the reception antenna 20, a reception signal that is a transmitted transmission signal reflected on the target located ahead and returns.

The above described reception unit 40 receives, through a reception antenna 20, a reception signal that is a transmission signal reflected on the target located before a vehicle and returns, in which the transmission signal is transmitted through the transmission antenna 10. Here, the reception unit 40 receives, through the reception antenna 20, a signal in which a time delay corresponding to a round-trip distance of the target and a frequency shift according to a relative velocity of the target have occurred.

The signal processing unit 50 measures the velocity and distance of the target through a frequency difference between the transmission signal and the reception signal.

Here, the multi-chirp signal includes a first chirp signal having a first slope and a second chirp signal having a second slope that is different from the first slope, in order to improve accuracy of the velocity of the target. It is preferable that the first slope is smaller than the second slope in order to modify correction of the target having a negative (−) frequency value, but the present embodiments are not limited thereto.

Alternatively, the first chirp signal and the second chirp signal may have different periods. For example, a period of the first chirp signal may be configured to be longer than a period of the second chirp signal. A period of a chirp signal means time during which one up-chirp and one down-chirp signals are transmitted. For example, a period of a chirp signal may mean a time interval during which a transmission chirp signal repeats an up-chirp and a down-chirp, and transmits the same frequency. In this case, a frequency fluctuation range according to the time of the first chirp signal and a frequency fluctuation range according to the time of the second chirp signal may be configured to be the same. Alternatively, the maximum frequencies and minimum frequencies of the first chirp signal and the second chirp signal may be configured to be the same.

Meanwhile, the first chirp signal and the second chirp signal may be repeatedly transmitted. For example, the second chirp signal may be transmitted after the first chirp signal has been transmitted, and then the first chirp signal may be transmitted again. That is, the second chirp signal may be transmitted between the interval of the first chirp signal transmissions. There may be a time gap or a guard time between the first chirp signal and the second chirp signal, where the transmission signal is not transmitted for a predetermined time, as needed. Alternatively, the first chirp signal and the second chirp signal may be continuously transmitted in accordance with changes in time.

The above described signal processing unit 50 measures the distance and velocity of the target using a frequency difference between the transmission signal that is the transmitted first chirp signal and the reception signal that is the transmission signal reflected on the corresponding target and returns, frequency variation according to the distance of the target, and frequency variation according to the velocity of the target, in which the frequency variations are acquired through the first chirp signal.

Here, the signal processing unit 50 measures the distance and velocity of the target using frequency variation according to the distance of the target and frequency variation according to the velocity of the target which are acquired through the second chirp signal when it is determined that the corresponding target has a sum of frequency variation according to the distance of the target and frequency variation according to the velocity of the target, which has a negative (−) frequency.

Referring to FIG. 4, the signal processing unit 50 includes a calculation unit 51, a determination unit 52, and a target measurement unit 53. The calculation unit 51 calculates a frequency difference between the transmission signal that is the first chirp signal transmitted by the transmission unit 30 and the reception signal that is the first chirp signal reflected on the target and received by the reception unit 40, frequency variation according to the distance of the target, and frequency variation according to the velocity of the target.

In addition, the calculation unit 51 calculates a frequency difference between the transmission signal that is the second chirp signal transmitted by the transmission unit 30 and the reception signal that is the second chirp signal reflected on the target and received by the reception unit 40, frequency variation according to the distance of the target, and frequency variation according to the velocity of the target.

The determination unit 52 determines whether a sum of frequency variation according to the distance of the target and frequency variation according to the velocity of the target is less than zero. That is, when a vehicle approaches at a high speed in a short distance, a velocity element is large, and the sum of frequency variation according to the distance of the target and frequency variation according to the velocity of the target thus has a negative (−) frequency value.

Based on the result of the determination by the determination unit 34, when the sum of frequency variation according to the distance of the target and frequency variation according to the velocity of the target is less than zero, the target measurement unit 53 measures the distance and velocity of the target using a sum of frequency variation according to the distance of the target and frequency variation according to the velocity of the target which are acquired through a frequency difference between the transmission signal that is the transmitted second chirp signal and the reception signal that is the second chirp signal reflected on the target and received.

More specifically, the target measurement unit 53 measures the distance and velocity of the target using the sum of frequency variation according to the distance of the target and frequency variation according to the velocity of the target, in which the frequency variations are calculated through the second chirp signal when the sum of frequency variation according to the distance of the target and frequency variation according to the velocity of the target is less than zero, and the target measurement unit 53 measures the distance and velocity of the target using the sum of frequency variation according to the distance of the target and frequency variation according to the velocity of the target, in which the frequency variations are calculated through the first chirp signal when the sum of frequency variation according to the distance of the target and frequency variation according to the velocity of the target is greater than zero (alternatively, a case where the sum is equal to or greater than zero).

Accordingly, a distance and a velocity of a target may be measured by detecting the target that approaches at a high speed in a short distance, like an AEB situation, so that a safe driving environment can be provided even without support of additional hardware.

A target measurement method for a radar device for a vehicle, having the configuration as above is described with reference to FIG. 5 as follows.

Figure 5:
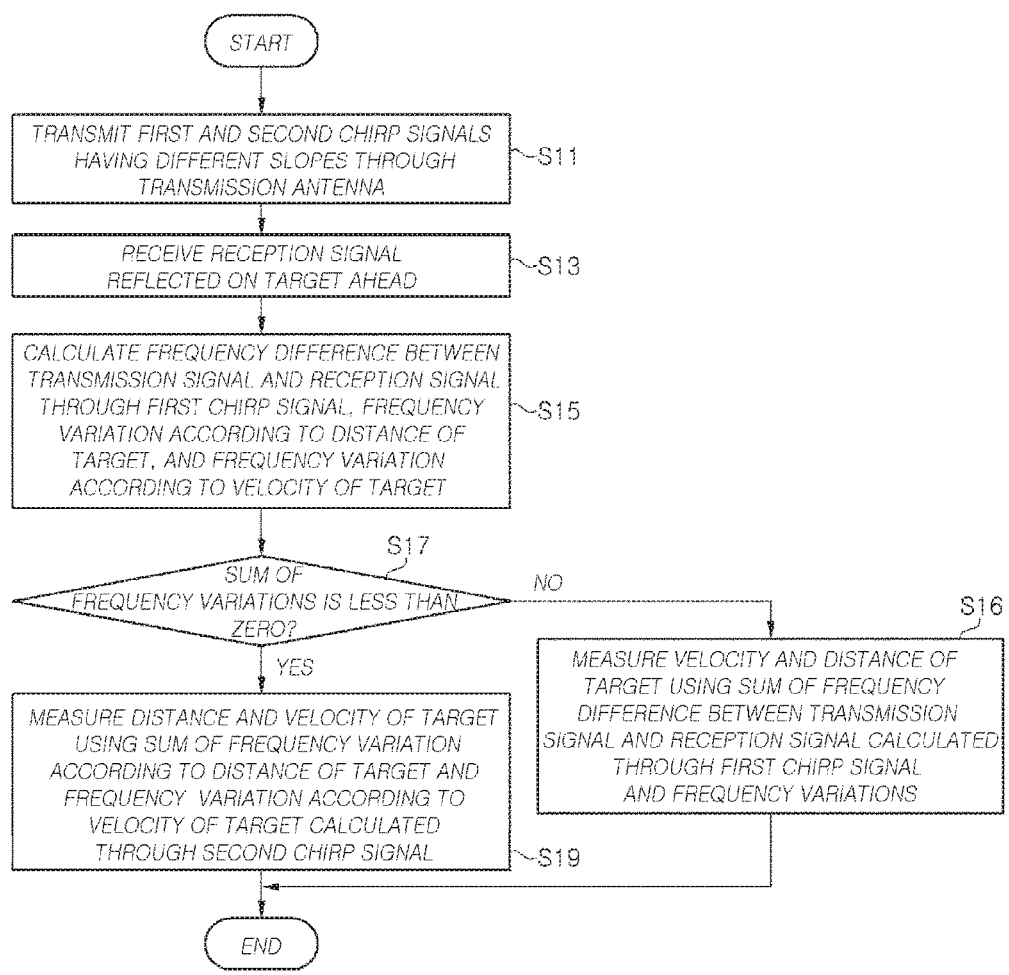
FIG. 5 is an operation flow diagram for describing a target measurement method for a radar device for a vehicle according to another embodiment.

FIG. 5 illustrates an operation flow diagram for describing a target measurement method for a radar device for a vehicle according to another embodiment.

Figure 6:
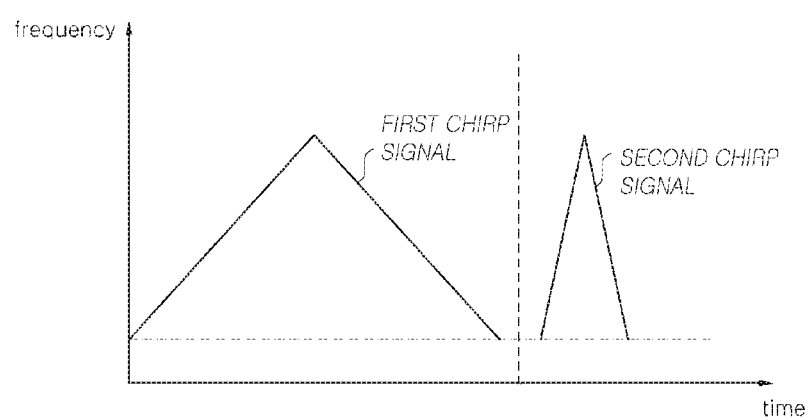
FIG. 6 is a diagram for describing a multi-chirp signal.

Referring to FIG. 5, a transmission unit 30 included in a radar device 1 for a vehicle transmits S11, as a transmission signal, a multi-chirp signal having different slopes, that is a first chirp signal and a second chirp signal through a transmission antenna 10. The first and second chirp signals have different slopes, in which the first chirp signal may have a gentle slope but the second chirp signal may have a steep slope. The first and second chirp signals are well illustrated in FIG. 6.

A reception unit 40 included in the radar device 1 for a vehicle receives S13, through a reception antenna 20, a reception signal that is the transmission signal reflected on the target located before the vehicle, in which the transmission signal is transmitted through the transmission antenna 10.

A signal processing unit 50 included in the radar device 1 for a vehicle calculates S15 a frequency difference between the transmission signal and the reception signal using the transmission signal and reception signal through the first chirp signal, frequency variation according to the distance of the target, and frequency variation according to the velocity of the target.

The signal processing unit 50 determines S17 whether a sum of the above calculated frequency variation according to the distance of the target and the above calculated frequency variation according to the velocity of the target is less than zero.

That is, the signal processing unit 50 determines whether a sum of frequency variation ($f_R$) according to the distance of the target and frequency variation ($f_D$) according to the velocity of the target is less than zero, as described in [EQUATION 1] below.

$$f_R + f_D = \frac{2R \cdot B}{c \cdot T_{sweep}} + \frac{2v}{\lambda} < 0 \quad \text{[EQUATION 1]}$$

Here, C is the velocity of light, B is a bandwidth ($F_{max} - F_{min}$), R is distance of a target, v is a relative velocity, $\lambda$ is the length of a frequency wavelength, and $T_{sweep}$ is the above described sweep time, that is a time during which an amplitude increases from the minimum value to the maximum value.

Figure 7A:
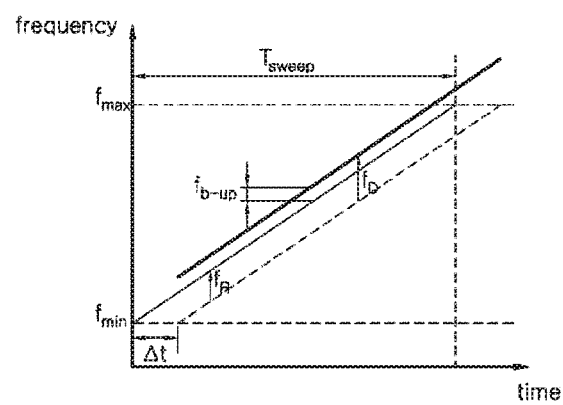
FIG. 7A and FIG. 7B is a diagram illustrating a transmission signal for each multi-chirp signal, a reception signal, frequency variation according to distance, and frequency variation according to velocity.

Based on the result of the determination in step S17, when the sum of frequency variation according to the distance of the target and frequency variation according to the velocity of the target is less than zero, that is, when the sum of frequency variation according to the distance of the target and frequency variation according to the velocity of the target has a negative (−) value as illustrated in FIG. 7A, the signal processing unit 50 measures S19 the distance and velocity of the target using a sum of frequency variation according to the distance of the target and frequency variation according to the velocity of the target, in which the frequency variations are calculated through the second chirp signal.

Based on the result of the determination in step S17, when the sum of frequency variation according to the distance of the target and frequency variation according to the velocity of the target is greater than zero, the signal processing unit 50 measures S16 the distance and velocity of the target using frequency variation according to the distance of the target and frequency variation according to the velocity of the target, in which the frequency variations are calculated through the first chirp signal.

Figure 7B:
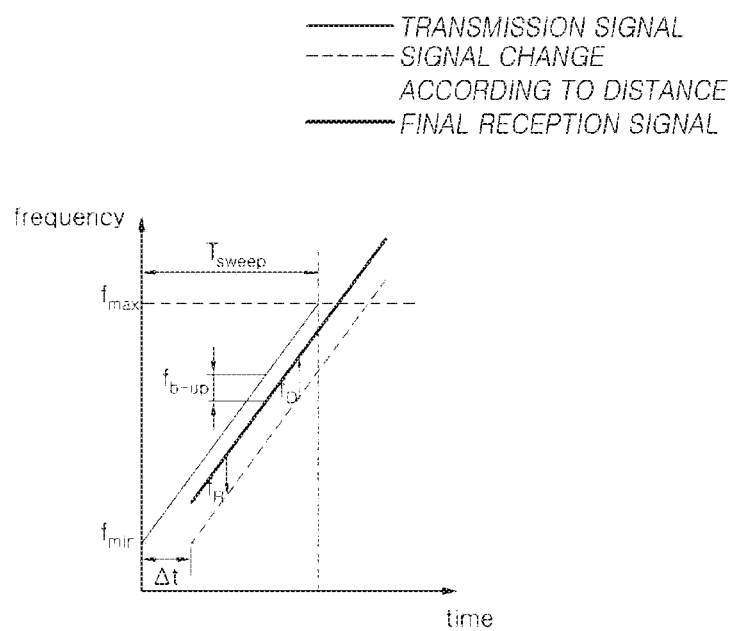

FIG. 7B illustrates the transmission signal that is the transmitted second chirp signal, the reception signal that is the second chirp signal reflected on the target, and frequency variation according to the distance of the target. As shown in FIG. 7B, when the second chirp signal is used, frequency variation according to the velocity of the target remains the same like a case where the first chirp signal is used, but frequency variation according to a distance of the target becomes greater than that in a case where the first chirp signal is used. Therefore, the distance and velocity of a target having a positive frequency (+), that is not a target having a negative frequency (−), are reflected so that a problem of an undetected or mistakenly detected target that approaches at a high speed in a short distance may be able to be solved.

The present disclosure is not limited by the embodiments described above, and may be variously modified and changed by those skilled in the art, which is included within the spirit and scope of the present disclosure as defined in the appended claims.

DESCRIPTION OF REFERENCE NUMERALS

10: Transmission antenna
20: Reception antenna
30: Transmission unit
40: Reception unit
50: Signal processing unit
51: Calculation unit
52: Determination unit
53: Target measurement unit

What is claimed is:

1. A Frequency Modulation Continuous Wave (FMCW)-type radar device for a vehicle, including a transmission antenna and a reception antenna that are installed in a vehicle to detect a target located before the vehicle, the radar device for a vehicle, comprising:

a transmission unit configured to transmit, as a transmission signal, a multi-chirp signal having different slopes through the transmission antenna;

a reception unit configured to receive, through the reception antenna, a reception signal that is the transmission signal reflected on the target located before the vehicle, wherein the transmission signal is transmitted by the transmission unit; and a signal processing unit configured to process the transmission signal and the reception signal so as to calculate distance and velocity information of the target, wherein the signal processing unit is configured to calculate, using frequency information of the transmission signal and frequency information of the reception signal, each of i) a frequency difference between the transmission signal and the reception signal, ii) frequency variation according to a distance of the target, and iii) frequency variation according to a velocity of the target, wherein the multi-chirp signal includes a first chirp signal having a predetermined first slope and a second chirp signal having a predetermined second slope, wherein the first slope and the second slope are different, and wherein the signal processing unit comprises:

a calculation unit configured to calculate a frequency difference between a transmission signal with respect to the first chirp signal in the transmission signal and a reception signal, frequency variation according to the distance of the target, and frequency variation according to the velocity of the target;

a determination unit configured to determine whether a sum of the calculated frequency variation according to the distance of the target and the calculated frequency variation according to the velocity of the target is less than zero; and a target measurement unit configured to measure, based on the result of the determination by the determination unit: the distance and velocity of the target by using a sum of frequency variation according to the distance of the target and frequency variation according to the velocity of the target when the sum is less than zero, wherein the frequency variations are calculated through the second chirp signal in the transmission signal; and the distance and velocity of the target by using a sum of frequency variation according to the distance of the target and frequency variation according to the velocity of the target when the sum is equal to or greater than zero, wherein the frequency variations are calculated through the first chirp signal in the transmission signal.

2. The radar device for a vehicle of claim 1, wherein a slope of the second chirp signal is steeper than a slope of the first chirp signal.

3. The radar device for a vehicle of claim 1, wherein the multi-chirp signal includes a first chirp signal and a second chirp signal, wherein a period of the first chirp signal and a period of the second chirp signal are different.

4. The radar device for a vehicle of claim 3, wherein the period of the first chirp signal is configured to be longer than the period of the second chirp signal.

5. A target measurement method for a Frequency Modulation Continuous Wave (FMCW)-type radar device for a vehicle, including a transmission antenna and a reception antenna that are installed in a vehicle to detect a target located before the vehicle, the target measurement method for a radar device for a vehicle, comprising:
   transmitting, as a transmission signal, a multi-chirp signal having different slopes through the transmission antenna;
   receiving, through the reception antenna, a reception signal that is the transmission signal reflected on the target located before the vehicle, wherein the transmission signal is transmitted by the transmission unit; and
   processing the transmission signal and the reception signal so as to calculate distance and velocity information of the target,
   wherein measuring a distance and a velocity of the target includes calculating, using frequency information according to time of the transmission signal and frequency information according to time of the reception signal, each of i) a frequency difference between the transmission signal and the reception signal, ii) frequency variation according to a distance of the target, and iii) frequency variation according to a velocity of the target,
   wherein the multi-chirp signal includes a first chirp signal having a predetermined first slope and a second chirp signal having a predetermined second slope, wherein the first slope and the second slope are different, and
   wherein measuring the distance and velocity of the target comprises:
      calculating a frequency difference between a transmission signal with respect to the first chirp signal in the transmission signal and a reception signal, frequency variation according to the distance of the target, and frequency variation according to the velocity of the target;
      determining whether a sum of the calculated frequency variation according to the distance of the target and the calculated frequency variation according to the velocity of the target is less than zero; and
      measuring, based on the result of the determination: the distance and velocity of the target by using a sum of frequency variation according to the distance of the corresponding target and frequency variation according to the velocity of the corresponding target when the sum is less than zero, wherein the frequency variations are calculated through the second chirp signal in the transmission signal; and the distance and velocity of the target by using a sum of frequency variation according to the distance of the target and frequency variation according to the velocity of the target when the sum is equal to or greater than zero, wherein the frequency variations are calculated through the first chirp signal in the transmission signal.

6. The target measurement method of claim 5, wherein a slope of the second chirp signal is steeper than a slope of the first chirp signal.

7. The target measurement method of claim 5, wherein the multi-chirp signal includes a first chirp signal and a second chirp signal, wherein a period of the first chirp signal and a period of the second chirp signal are different.

8. The target measurement method of claim 7, wherein the period of the first chirp signal is configured to be longer than the period of the second chirp signal.

* * * * *